United States Patent
Matsui

(10) Patent No.: US 10,764,449 B2
(45) Date of Patent: Sep. 1, 2020

(54) MAINTENANCE SYSTEM FOR PERFORMING MAINTENANCE OF IMAGE FORMING APPARATUS

(71) Applicant: KYOCERA Document Solutions Inc., Osaka (JP)

(72) Inventor: Naoki Matsui, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/425,019

(22) Filed: May 29, 2019

(65) Prior Publication Data

US 2019/0373117 A1 Dec. 5, 2019

(30) Foreign Application Priority Data

May 31, 2018 (JP) ................. 2018-104860

(51) Int. Cl.
*H04N 1/00* (2006.01)
*H04N 1/44* (2006.01)

(52) U.S. Cl.
CPC ..... *H04N 1/00344* (2013.01); *H04N 1/00307* (2013.01); *H04N 1/00334* (2013.01); *H04N 1/4413* (2013.01); *H04N 2201/0094* (2013.01)

(58) Field of Classification Search
CPC ........... H04N 1/00344; H04N 1/00307; H04N 1/00334; H04N 1/4413; H04N 2201/0094
USPC ...................................................... 358/1.14
See application file for complete search history.

(56) References Cited

U.S. PATENT DOCUMENTS

| 2008/0088873 | A1* | 4/2008 | Chihara | ............... | G03G 21/046 |
| | | | | | 358/1.15 |
| 2012/0182572 | A1* | 7/2012 | Kaneko | ................. | G06F 3/1203 |
| | | | | | 358/1.15 |
| 2012/0229867 | A1* | 9/2012 | Takagi | ................. | H04N 1/4413 |
| | | | | | 358/3.28 |
| 2012/0268791 | A1* | 10/2012 | Shibata | ............. | G06K 15/4095 |
| | | | | | 358/1.16 |

(Continued)

FOREIGN PATENT DOCUMENTS

JP H10-217580 A 8/1998
JP 2007-041840 A 2/2007

*Primary Examiner* — Allen H Nguyen
(74) *Attorney, Agent, or Firm* — IP Business Solutions, LLC

(57) ABSTRACT

An image forming apparatus includes a control unit and a storage section. The control unit includes a processor, and through execution of a control program by the processor, functions as a failure information generation section, an information encoding section, and a code generation section. The failure information generation section, upon occurrence of a predefined abnormality related to operation of the image forming apparatus, generates failure information in which information related to the abnormality is visualized in a character. The information encoding section generates encoded failure information obtained by encoding the failure information generated by the failure information generation section. The code generation section generates a code image obtained by one-dimensionally or two-dimensionally coding the encoded failure information generated by the information encoding section. The storage section stores, as an image file, the code image generated by the code generation section.

2 Claims, 2 Drawing Sheets

(56) References Cited

U.S. PATENT DOCUMENTS

| | | | |
|---|---|---|---|
| 2015/0077790 A1* | 3/2015 | Nagasawa | G06F 3/1236 358/1.15 |
| 2016/0379144 A1* | 12/2016 | Mizuno | G06Q 10/0635 705/7.28 |
| 2017/0285616 A1* | 10/2017 | Kaneko | B33Y 10/00 |
| 2018/0234295 A1* | 8/2018 | Koyama | H04L 67/34 |

* cited by examiner

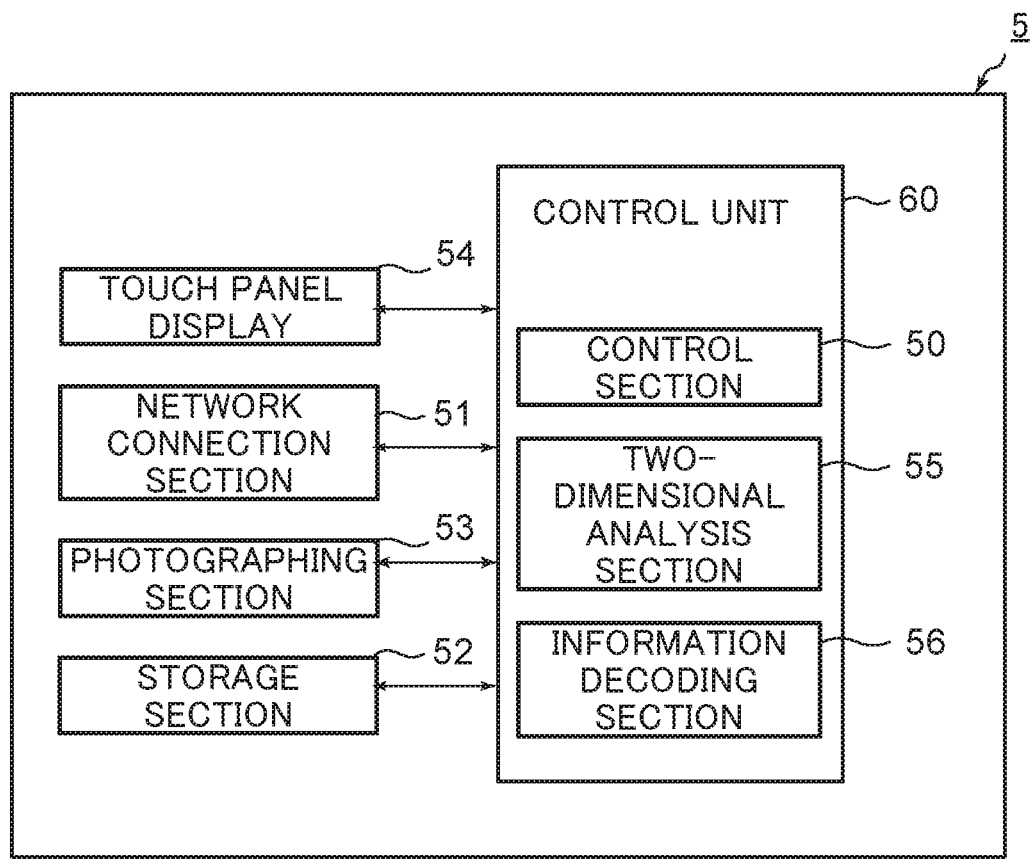

MAINTENANCE SYSTEM FOR PERFORMING MAINTENANCE OF IMAGE FORMING APPARATUS

INCORPORATION BY REFERENCE

This application claims priority to Japanese Patent Application No. 2018-104860 filed on May 31, 2018, the entire contents of which are incorporated by reference herein.

BACKGROUND

This disclosure relates to an image forming apparatus that forms an image on a recording medium and performs outputting, and a maintenance system for performing maintenance of the image forming apparatus.

Multifunction peripherals have been widely used which include: for example, a printer function of forming an image on a recording medium (paper) and performing outputting; a scanner function of optically reading a document; and a facsimile function. Moreover, some multifunction peripherals include a function of performing various types of operation via a network. Various operation modes are set upon execution of such various functions, which has complicated configuration of the multifunction peripherals. Thus, when a failure occurs, cause elucidation and repair of the failure may not be easy in many cases.

Thus, there is a first technology in which, upon occurrence of an abnormality in an image forming apparatus, information of the abnormality (for example, a log file) is automatically notified to another device (a service center) via a network and a detailed approach depending on the abnormality is set on a service center side. There is also a second technology in which an image forming apparatus images and outputs information related to an occurring abnormality as a one-dimensional code or a two-dimensional code, a mobile terminal for maintenance reads this image and notifies the image to a maintenance server, and the server sets a detailed approach depending on the image.

SUMMARY

A technology obtained by further improving the technology described above will be suggested as one aspect of this disclosure.

An image forming apparatus according to one aspect of this disclosure refers to an image forming apparatus forming an image on a recording medium and including a control unit and a storage section. The control unit includes a processor and functions, through execution of a control program by the processor, as a failure information generation section, an information encoding section, and a code generation section. The failure information generation section, upon occurrence of a predefined abnormality related to operation of the image forming apparatus, generates failure information in which information related to the abnormality is visualized in a character. The information encoding section generates encoded failure information obtained by encoding the failure information generated by the failure information generation section. The code generation section generates a code image obtained by one-dimensionally or two-dimensionally coding the encoded failure information generated by the information encoding section. The storage section stores, as an image file, the code image generated by the code generation section.

A maintenance system for an image forming apparatus according to another aspect of this disclosure uses a combination of the image forming apparatus described above; a code analysis section acquiring the code image to obtain the encoded failure information from the code image; and an information decoding section decoding the encoded failure information to acquire the failure information.

BRIEF DESCRIPTION OF THE DRAWINGS

FIG. 2 is a diagram illustrating configurations of a mobile phone used in the maintenance system of the image forming apparatus according to the embodiment of this disclosure.

DETAILED DESCRIPTION

Figure 1:
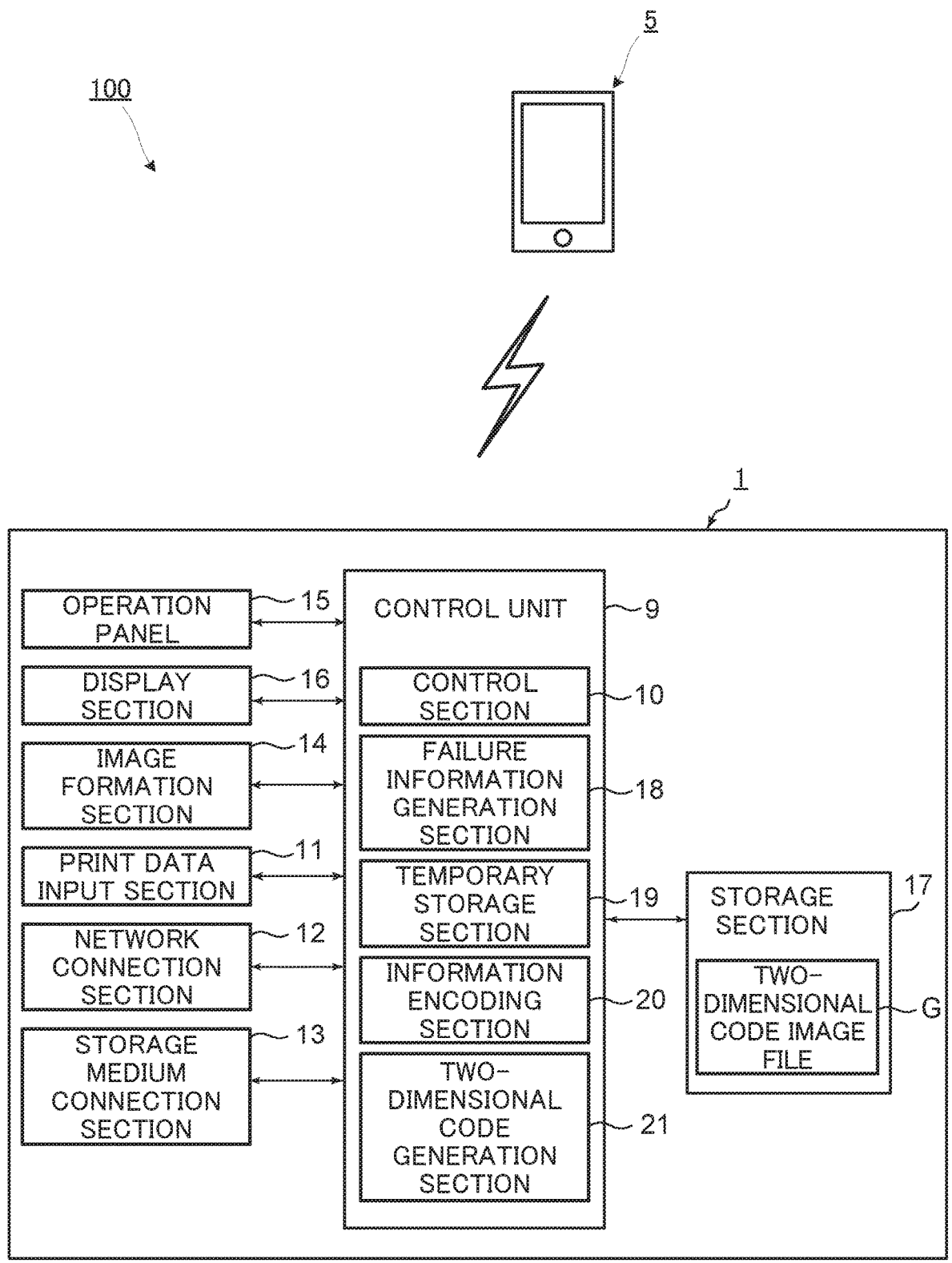
FIG. 1 is a diagram illustrating configurations of an image forming apparatus and a maintenance system according to an embodiment of this disclosure.

Hereinafter, an embodiment of this disclosure will be described with reference to the drawings. FIG. 1 is a diagram illustrating configurations of an image forming apparatus and a maintenance system according to the embodiment.

An image forming apparatus 1 is a multifunction peripheral combining together a plurality of functions such as, for example, a copy function, a printer function, a scanner function, and a facsimile function. The image forming apparatus 1 includes: a control unit 9, a print data input section 11, a network connection section 12, a storage medium connection section 13, an image formation section 14, an operation panel 15, a display section 16, and a storage section 17.

The image forming apparatus 1 performs, as the printer function, print output based on a print job transmitted from an information processor (for example, a personal computer) connected via a network, or image output based on a text file or an image file included in a connected storage medium. The image forming apparatus 1 also, as the scanner function, optically reads a document to acquire image data.

The control unit 9 is composed of, for example: a processor, a random access memory (RAM), a read only memory (ROM). The processor is, such as, a central processing unit (CPU), an MPU, or an ASIC. Through execution of a control program stored in, for example, the storage section 17 by the processor, the control unit 9 functions as a control section 10, a failure information generation section 18, a temporary storage section 19, an information encoding section 20, and a two-dimensional code generation section 21. Note that the control section 10, the failure information generation section 18, the information encoding section 20, and the two-dimensional code generation section 21 may each be formed by a hard circuit without depending on operation performed based on the aforementioned control program.

The control section 10 is in charge of overall operation and control of the image forming apparatus 1. The control section 10 is connected to sections, such as the print data input section 11, the network connection section 12, the storage medium connection section 13, the image formation section 14, the operation panel 15, the display section 16, and the storage section 17, and performs driving control of each of the aforementioned sections.

Print data used for print operation is inputted to the print data input section 11. For example, in the image forming apparatus 1, a document reading section, not illustrated, optically reads, for example, an image of a document fed by a document feed section, not illustrated, and generates image data of the document through the aforementioned reading operation. The print data input section 11 acquires the generated image data as print data.

The network connection section 12 is a communication interface having a communication module, such as a LAN board. The network connection section 12 performs various types of data communication with, for example, the information processor via the network connected to the network connection section 12 under control performed by, for example, the control section 10. For example, the network connection section 12 acquires the print data received from the information processor via the network.

The storage medium connection section 13 is a connection interface, such as an USB port, which acquires a text file and an image file from a USB-connectable, small-size recording medium (for example, a USB memory or a portable hard disc).

The image formation section 14 forms an image on the recording medium (paper) and performs outputting, based on, for example, the print data acquired from the print data input section 11 or the storage medium connection section 13 under control performed by the control section 10. The image formation section 14 includes: a mechanism of forming a toner pattern on the paper; a mechanism of heating and pressurizing the resulting paper to fix the toner pattern; and a mechanism of conveying the paper between the aforementioned mechanisms at a speed controlled for causing performance of the aforementioned operation.

The operation panel 15 is composed of, for example, a plurality of operation keys and receives the operation from a user.

The display section 16 is a display or the like which displays various pieces of information. The display section 16 is, for example, a liquid crystal display (LCD).

Upon occurrence of a predetermined abnormality related to the operation of the image forming apparatus 1, the failure information generation section 18 generates failure information in which information related to the abnormality is visualized in a character.

The temporary storage section 19 is a storage element, such as a random access memory (DRAM).

The information encoding section 20 generates encoded failure information obtained by encoding the failure information generated by the failure information generation section 18.

The two-dimensional code generation section 21 generates a code image provided as a two-dimensional code of the encoded failure information generated by the information encoding section 20.

The storage section 17 is a storage device such as a nonvolatile memory or a hard disc. The storage section 17 stores, as an image file, the code image generated by the two-dimensional code generation section 21.

Further, the control section 10 is capable of recognizing or detecting that a predefined abnormality related to the operation of the image forming apparatus 1 has occurred. For example, the control section 10 is in charge of the overall operation and control of the image forming apparatus 1, and thus upon occurrence of an abnormality during operation of the image formation section 14 (as one example, in a case where output has not been performed during predefined time since the operation of the image formation section 14), the control section 10 can recognize the abnormality. In this case, the control section 10 can recognize, for example, a power distribution status, a temperature, and an operation status of each component used in the image formation section 14, and can recognize various pieces of information directly linked to details of the abnormality. In the recognition, the control section 10 makes reference to the various pieces of data (database) stored in the storage section 17.

The failure information generation section 18 generates character information (failure information) in which statuses of each component upon occurrence of such an abnormality are written. The control section 10 causes the temporary storage section 19 to store the failure information generated by the failure information generation section 18. The control section 10 causes the display section 16 to display the failure information or causes the image formation section 14 to print and output the failure information on the paper. Consequently, the failure information is in a such a format, for example, a text file, that can be recognized by a user. The same applies to the second technology described above in this point.

Here, the control section 10 encodes the failure information by using a known encoding technique by the information encoding section 20. Specifically, the information encoding section 20 generates the encoded failure information obtained by encoding the failure information. The failure information not subjected to the encoding is normal character information, so that the user can recognize details of the information as described above. On the contrary, details of the failure information subjected to the encoding (the encoded failure information) can only be recognized by the user after decoding of the encoded failure information. The control section 10 erases the failure information not subjected to the encoding from the temporary storage section 19 and causes the temporary storage section 19 to store the encoded failure information instead.

The two-dimensional code generation section 21 converts the encoded failure information into a two-dimensional code according to standards of a QR code (registered trademark). The control section 10 causes the storage section 17 to store the QR code as image data (image file: two-dimensional code image file G). The image file can be in any desired form such as, for example, a bit map format or a JPEG format.

The control section 10 is capable of causing the display section 16 to display an image based on the two-dimensional code image file G in accordance with operation of the operation panel 15 performed by the user, causing the recording medium connected to the storage medium connection section 13 to store the two-dimensional code image file G, and causing the two-dimensional code image file G to be transmitted by an e-mail or a server message block (SMB) to an external device via the network connection section 12. Thus, the other devices can acquire the two-dimensional code (the two-dimensional code image file G) from the image forming apparatus 1 in various modes with ensured confidentiality.

With the image forming apparatus 1 described above, the information encoding section 20 generates the encoded failure information obtained by encoding the failure information, and thus measures taken upon occurrence of an abnormality in the image forming apparatus 1 can be achieved with ensured confidentiality of information related to the abnormality.

Now, a maintenance system 100 for performing maintenance of the image forming apparatus 1 will be described. The maintenance system 100 includes the image forming apparatus 1 and a mobile terminal 5. The mobile terminal 5 acquires the aforementioned two-dimensional code (the two-dimensional code image file G). FIG. 2 is a diagram illustrating configurations of the mobile terminal used in the maintenance system of the image forming apparatus according to the embodiment of this disclosure. The mobile terminal 5 is, for example, a smartphone.

As illustrated in FIG. 2, the mobile terminal 5 includes: a network connection section 51, a storage section 52, a photographing section 53, a touch panel display 54, and a control unit 60.

The network connection section 51 is a communication interface having a communication module such as a LAN board, and performs, for example, various types of data communication with the image forming apparatus 1. Note that the network connection section 51 corresponds to "a network communication section" in the claims.

The storage section 52 is a storage device which stores various pieces of information. The photographing section 53 is, for example, a camera, which acquires image data (that is, a code image) of the two-dimensional code by photographing an image based on the two-dimensional code image file G.

The touch panel display 54 functions as an operation panel which receives operation performed by the user and also functions as a display section. The user can operate the mobile terminal 5 by using the touch panel display 54.

The control unit 60 is composed of, for example: a processor, a random access memory (RAM), and a read only memory (ROM). The processor is, such as, a central processing unit (CPU), an MPU, or an ASIC. Through execution of a decoding control program stored in, for example, the storage section 52 by the aforementioned processor, the control unit 60 functions as a control section 50, a two-dimensional code analysis section 55, and an information decoding section 56. Note that the control section 50, the two-dimensional code analysis section 55, and the information decoding section 56 may each be formed by a hard circuit without depending on the decoding control program.

The control section 50 performs overall control of the mobile terminal 5.

The two-dimensional code analysis section 55 acquires the encoded failure information from the image data (code image) of the two-dimensional code photographed by the photographing section 53. Note that the two-dimensional code analysis section 55 corresponds to a "a code analysis section" in the scope of the claims.

The information decoding section 56 decodes the encoded failure information acquired by the two-dimensional code analysis section 55 to acquire the failure information.

The mobile terminal 5 acquires the two-dimensional code as the image data by photographing the two-dimensional code displayed at the display section 16 in the image forming apparatus 1. Moreover, the mobile terminal 5 can also acquire the aforementioned two-dimensional code image file G even by, for example, an e-mail via the network connection section 51. The control section 50 can acquire the failure information subjected to the encoding from the aforementioned image data and the two-dimensional code image file by using the two-dimensional code analysis section 55 and causes the storage section 52 to store the aforementioned failure information.

The information decoding section 56 decodes the data encoded by the information encoding section 20 to acquire the failure information (that is, the failure information not subjected to the encoding). Thus, after the information decoding section 56 decodes the encoded failure information stored in the storage section 52 to acquire the failure information not subjected to the encoding as described above, and the control section 50 causes the storage section 52 to store the acquired failure information not subjected to the encoding. As described above, the failure information not subjected to the encoding is a text file, which can be displayed on the touch panel display 54 whereby the user of the mobile terminal 5 can confirm details of the aforementioned information. Thus, the user of the mobile terminal 5 can view this to consider a method for supporting the failure occurring in the image forming apparatus 1.

With the maintenance system 100 of this embodiment, measures against a case where any abnormality has occurred in the image forming apparatus 1 can appropriately be taken while maintaining confidentiality of the information related to the abnormality.

Here, as described above, a normal smartphone has a function of photographing and analyzing the QR code (two-dimensional code) to thereby obtain text data serving as a basis of the QR code. Thus, only the information decoding section 56 in the configuration of FIG. 2 has no normal smartphone. Note that, however, the information decoding section 56 can easily obtain the aforementioned function by installing an application provided with the aforementioned function in the mobile terminal 5. Thus, the mobile terminal 5 can use a normal smartphone in practice.

Moreover, two types of settings can be provided for the encoding performed by the information encoding section 20 in the image forming apparatus 1. In one of the settings, the information decoding section 56 can perform the decoding without requiring password input after the encoded failure information is obtained on a mobile terminal 5 side as described above. In the other setting, the decoding is performed after the password input. Which of such two settings is to be provided can be set for each of every portion of a single piece of the failure information. To this end, the single piece of the failure information may be divided into a plurality of pieces of data for each such a portion for convenience. Then the information decoding section 56 of the mobile terminal 5 decodes, by using the password, the encoded failure information acquired by the two-dimensional code analysis section 55 to acquire the failure information. As described above, the use of the password can particularly improve confidentiality of the failure information.

In this case, the information encoding section 20 of the image forming apparatus 1 encodes part of the failure information (that is, the failure information not subjected to the encoding) and encodes portions other than the part of the failure information without using the inputted password. Moreover, the information decoding section 56 of the mobile terminal 5 decodes the part of the encoded failure information acquired by the two-dimensional code analysis section 55 by using the password and decodes the portions other than the part of the encoded failure information without using the password to acquire the failure information. This permits, for example, settings such that a general user of the image forming apparatus 1 can view only a portion which requires no password (that is, the part of the failure information) and, for example, only a shop staff member who repairs the image forming apparatus 1 can input the password to view any portion (that is, the portions other than the part of the failure information) which requires the password.

Upon occurrence of an abnormality (failure) in the image forming apparatus 1, the two-dimensional code (the two-dimensional code image file G) can easily be acquired in various forms by other devices (for example, the mobile terminal 5). Further, it is also easy to cause the given device to acquire the two-dimensional code (the two-dimensional code image file G) as an image file and cause the still another device to acquire the two-dimensional code (the two-dimensional code image file G) as the image file in an intact form without decoding details of the two-dimensional code (the two-dimensional code image file G) as described above. Alternatively, the two-dimensional code can also be transmitted by using a facsimile or the like. Thus, the two-dimensional code can easily be taken into, for example, a service center side. On the other hand, the failure information not subjected to the encoding cannot be obtained unless the information decoding section 56 or an application (software) corresponding thereto is provided. Thus, confidentiality for the failure information in this condition can be ensured.

Note that an image obtained by two-dimensionally coding the encoded failure information by the two-dimensional code generation section 21 is used in the example described above, but as long as the encoded failure information can be specified from the aforementioned image, a method of coding the image is optional. For example, a one-dimensional image instead of the two-dimensional code may be used. For example, the code generation section may generate a code image obtained by one-dimensionally coding the encoded failure information generated by the information encoding section 20 and the two-dimensional code analysis section 55 may acquire the encoded failure information from the image data of the one-dimensional code (code image) photographed by the photographing section 53.

The first technology described in the background art above is applicable to only an image forming apparatus connected to a service center via a network. Thus, the technology has not been applicable to, for example, an image forming apparatus which is connected to an internal intranet only and an image forming apparatus which cannot be connected to an outside via a network to deal with highly confidential information.

On the other hand, with the second technology described in the background art above, information transmission from an image forming apparatus is performed by images (the one-dimensional code image and two-dimensional image), and thus the technology is applicable to even an image forming apparatus which is not connected to a network. However, a mobile terminal dedicated for mediating between the image forming apparatus and a server is required.

Moreover, information itself related to an abnormality generated from the image forming apparatus may have confidentiality. With the first technology in this case, this information is provided with ensured same level of confidentiality as confidentiality provided upon transmission of normal information via the network. On the other hand, with the second technology, an image which can easily be read by an outsider is used, thus resulting in difficulties in ensuring confidentiality even when a mobile terminal is provided for mediation with the server.

Thus, in the first and second technologies, measures against a case where any abnormality has occurred in the image forming apparatus cannot appropriately be taken while maintaining the confidentiality of the information related to the abnormality.

On the contrary, the measures against the case where any abnormality has occurred in the image forming apparatus can appropriately be taken while maintaining the confidentiality of the information related to the abnormality in this embodiment.

Moreover, the configuration and the processing of the embodiment described above with reference to FIGS. 1 and 2 form just one embodiment of this disclosure, and this disclosure is not limited to the aforementioned configuration and processing in any manner.

While this disclosure has been described in detail with reference to the embodiments thereof, it would be apparent to those skilled in the art the various changes and modifications may be made therein within the scope defined by the appended claims.

What is claimed is:

1. A maintenance system for performing maintenance of an image forming apparatus forming an image on a recording medium, the maintenance system comprising:
the image forming apparatus; and
a mobile terminal,
wherein the image forming apparatus includes:
a control unit including a CPU and functioning, through execution of a control program by the CPU, as:
a control section;
a failure information generation section, upon occurrence of a predefined abnormality related to operation of the image forming apparatus, generating failure information in which information related to the abnormality is visualized in a character;
an information encoding section generating encoded failure information obtained by encoding the failure information generated by the failure information generation section; and
a code generation section generating a code image obtained by one-dimensionally or two-dimensionally coding the encoded failure information generated by the information encoding section; and
a storage device storing, as an image file, the code image generated by the code generation section,
the mobile terminal includes:
a control unit including a CPU and functioning, through execution of a decoding control program by the CPU, as:
a code analysis section acquiring the encoded failure information from the code image; and
an information decoding section decoding the encoded failure information acquired by the code analysis section to acquire the failure information,
the information encoding section of the image forming apparatus generates encoded failure information obtained by encoding the failure information by using a password inputted, and
the information decoding section of the mobile terminal decodes the encoded failure information acquired by the code analysis section by using the password to acquire the failure information.

2. The maintenance system according to claim 1, wherein the information encoding section of the image forming apparatus encodes a part of the failure information by using the password inputted and encodes other part than the part of the failure information without using the password inputted, and
the information decoding section of the mobile terminal decodes the part of the encoded failure information acquired by the code analysis section by using the password and decodes the other part than the part of the failure information without using the password to acquire the failure information.

* * * * *